United States Patent [19]

Velazquez

[11] 4,305,674
[45] * Dec. 15, 1981

[54] LATERAL POSITION CONTROL MEANS FOR DATA PRINTER HEADS

[75] Inventor: Juan F. Velazquez, Saline, Mich.

[73] Assignee: Sycor, Inc., Ann Arbor, Mich.

[*] Notice: The portion of the term of this patent subsequent to Apr. 1, 1997, has been disclaimed.

[21] Appl. No.: 68,692

[22] Filed: Aug. 22, 1979

Related U.S. Application Data

[62] Division of Ser. No. 766,243, Feb. 9, 1977, Pat. No. 4,195,938.

[51] Int. Cl.³ .................................................. B41J 3/04
[52] U.S. Cl. ...................................... 400/124; 400/320; 400/323; 400/705.1
[58] Field of Search ................ 400/76, 120, 124, 126, 400/320, 322, 323, 705.1

[56] References Cited

U.S. PATENT DOCUMENTS

| 3,814,011 | 6/1974 | Kashio | 400/322 X |
| 3,858,702 | 1/1975 | Azuma | 400/320 |
| 3,970,183 | 7/1976 | Robinson et al. | 400/323 X |
| 4,050,563 | 9/1977 | Menhennett | 400/76 X |
| 4,114,750 | 9/1978 | Baeck et al. | 400/323 X |
| 4,195,938 | 4/1980 | Velazquez | 400/124 |

*Primary Examiner*—Ernest T. Wright, Jr.
*Attorney, Agent, or Firm*—Price, Heneveld, Huizenga & Cooper

[57] ABSTRACT

A rotary encoder is coupled to the drive for a printing head to detect and encode movement of the drive and produce signals therefrom which are used to control the direction and positioning of the printing head. A rotating disc-like wheel in the encoder has a plurality of peripheral window openings which act in conjunction with a light source and detector to produce a signal train from which the movement and instantaneous location of the printing head is determined.

4 Claims, 6 Drawing Figures

LATERAL POSITION CONTROL MEANS FOR DATA PRINTER HEADS

CROSS REFERENCE TO RELATED APPLICATION

This is a divisional application of pending application Ser. No. 766,243, filed FEB. 9, 1977 entitled LATERAL POSITION CONTROL MEANS FOR DATA PRINTER HEADS now issued as U.S. Pat. No. 4,195,938.

BACKGROUND OF THE INVENTION

1. Field of the Invention

This invention relates generally to data printers; and, more specifically to means for determining and controlling the position of printing heads in such devices.

2. Description of the Prior Art

It is known to use an elongated comb-like optical grid having openings extending along the length of the path of travel of a printing head which moves along a platen, and to use a light-emitting diode and a photo-transistor, or the like, coupled to the printing head so a signal is produced each time the printing head passes an opening in the grid. The position of the printing head along the grid can be determined by counting the number of pulses produced by the light-emitting diode and photo-transistor combination as the printing head moves laterally along the platen. However, there are practical limitations as to how closely such pulses can be spaced and how narrow their width may be made, because of the need for physically making the openings small enough and close enough together to produce more frequent pulses. Further, closer spacing typically requires more advanced fabricating technology which increases the cost of manufacture. Also, the practice of producing a single pulse for each opening passed does not indicate direction of motion of the printing head.

SUMMARY OF THE INVENTION

A rotary encoder in accordance with a preferred embodiment of this invention is coupled to the drive for a printing head, which may advantageously be a lead screw or worm-type drive screw which when rotated moves the printing head back and forth laterally, along the printing surface or platen. As the drive screw turns, a drive shaft in the encoder turns with it and drives a disc-like wheel mounted on the drive shaft. The wheel has window openings along its periphery. A first light-emitting source and photo or light detector set is mounted so that the source and detector are at the periphery on opposite sides of the wheel and light is transmitted between the two when there is a window opening aligned between them. A second light-emitting source and photodetector set, or pair, is circumferentially displaced from the first pair and similarly located on opposite sides of the wheel. The spacing of the two pairs, the relation of the width of the light beam between the elements of each pair, and the size of the window openings in the wheel are such that electrical encoder pulse signals generated by the two pairs are 90 electrical degrees apart from one another, i.e., in quadrature.

These encoder pulses are analyzed (i.e., logically processed) to determine the precise instantaneous location and direction of movement of the printing head. Information relevant to the instantaneous position of the printing head, which is normally kept moving at practically all times during practice, is constantly used to command further movement and positioning of the printing head, and also in actuating the printing head in its printing operation. The relationship between movement of the window openings in the encoder wheel and the displacement of the printing head can be varied to change the density or spacing of the characters printed on a printing surface. The windows in the wheel, whose movement indicates motion of the printing head, can be made relatively large compared to the openings of linear encoders, achieving both improved results and a cost saving by using selected gearing or other drive mechanism ratios to drive the printing head and the wheel of the encoder at desired proportioned speeds, and by placing the windows in the wheel at a selected radial distance outward from the axis of its rotation. For example, in one actual embodiment where the encoder wheel was approximately two inches in diameter, the windows of the wheel were about 0.060 inches in width, while in a linear grid extending along the printing platen, which would have been about eighteen inches long, the windows would have to have been about 0.005 inches in width, thus clearly requiring considerably more expense to manufacture and producing much more difficulty to control tolerances, as well as greater probability of error in detection. Additionally, by using a rotationally driven wheel encoder more pulses can be generated for a given displacement of the printing head along the carriage than if the window openings were along the carriage. This increase in the number of pulses can be advantageously used to increase the quality of the printing and to reduce printing errors, by providing smaller increments of printing head positioning and much more precise control.

DETAILED DESCRIPTION OF THE PREFERRED EMBODIMENT

Figure 1:
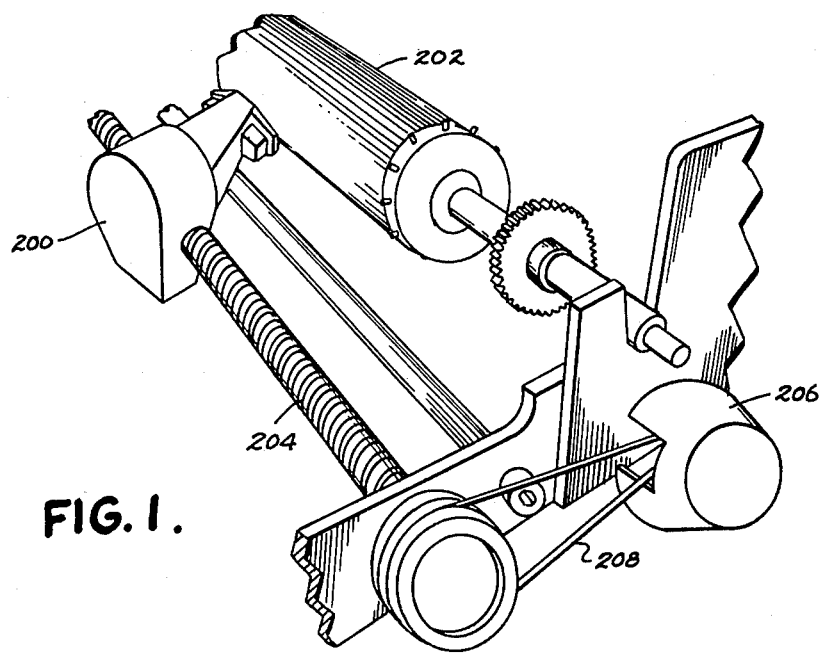
FIG. 1 is a frontal perspective view showing for purposes of illustration and environment a portion of a data printer which may be used in accordance with one embodiment of this invention.

Referring to the drawing, FIG. 1 shows a perspective view of parts of a data printing machine. A printing head 200 is moved laterally along a platen 202, for example by a threaded lead screw 204 which rotates and is rotationally coupled to a rotary encoder 206 by a drive belt 208. Printing head 200 may be of the impact type having printing needles (indicated pictorially in FIG. 5 by numeral 556), arranged, for example, in a single column, which can be axially impelled or "fired" to impinge an inked ribbon (not specifically illustrated) against a printing surface (557), thereby forming a printed "dot" of a desired size and shape on the printing surface 557. As the printing head 200 moves along the printing surface 557 additional dots are printed at specific locations, with coherent groupings of a plurality of dots forming characters such as letters or numbers.

Figure 2:
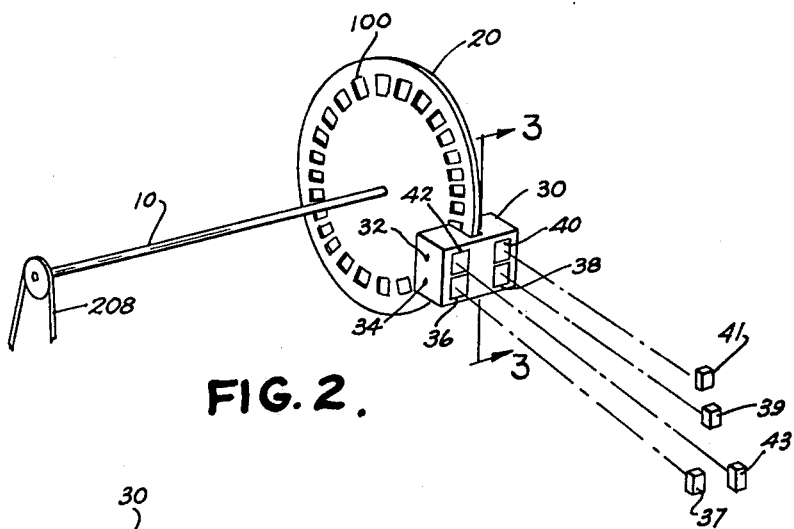
FIG. 2 is a frontal perspective view of an interior portion of an encoder in accordance with one embodiment of this invention.

FIG. 2 is a perspective view of internal components of rotary encoder 206, including an elongated drive shaft 10 affixed to the central axis of a wheel 20 and rotationally coupled to drive belt 208. Rotation of lead screw 204 results in lateral movement of printing head 200 and transmission of a proportional rotation to wheel 20 through belt 208 and shaft 10. Wheel 20 has peripheral coding means, for example, a plurality of windows 100, which rotate and are used to generate a signal which indicates lateral displacement of printing head 200. In a particular embodiment, printing head 200 may print at a rate of 120 characters per second, as one example, in which case encoder 206 may be geared at a five-to-one gear ratio from the main drive shaft 204, and encoder wheel 20 may include twenty equally spaced windows 100, resulting in a dot density on the surface 557 to be printed of 100 dots per inch, if each window 100 is made to correspond to a single dot position of the printing head 200 along the platen 202, which is a very desirable relationship. If it is desired to change the dot density, the drive ratio of encoder wheel 20 can be changed, and/or encoder wheel 20 can have a different number of windows 100 in it. Accordingly, the dot density on the surface 557 to be printed can be changed easily by changing the encoder module, while leaving most other parts of the printer the same.

Figure 3:
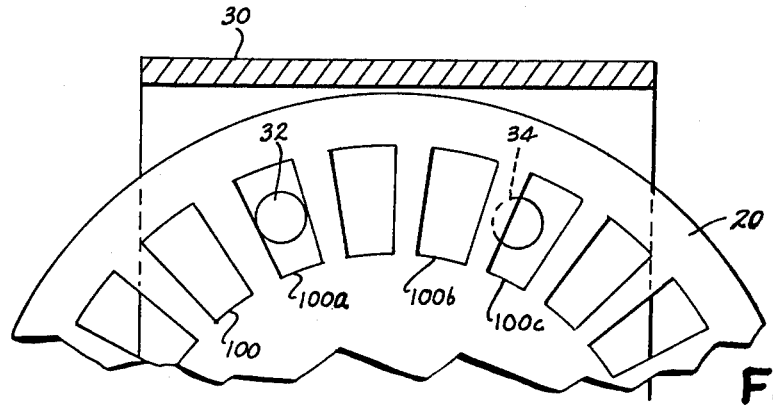
FIG. 3 is an enlarged, fragmentary cross-sectional view taken along section line 3—3 of FIG. 2.

As shown in FIG. 3, a plurality of window openings 100, 100a, 100b, 100c, et seq. are spaced circumferentially in a circle around the periphery of wheel 20. A U-shaped transducer housing 30, which extends around both side edges of wheel 20, has a pair of spaced cylindrical openings 32 and 34 (FIGS. 2 and 3) extending through the legs of housing 30 parallel to the axis of shaft 10 and displaced from shaft 10 the same radial distance as window openings 100. As wheel 20 rotates, the various window openings 100 move into and out of alignment with openings 32 and 34 to form a periodically interrupted light path. Additionally, housing 30 has rectangular mounting openings 36 and 38 intersecting opening 34 at a right angle and rectangular mounting openings 40 and 42 intersecting opening 32 at a right angle. Openings 36 and 42 extend into housing 30 parallel to the surface on a first side of wheel 20 and are adapted to receive light-emitting diodes 37 and 43, respectively, by which openings 32 and 34 may be illuminated. Openings 40 and 38 extend into housing 30 parallel to the surface on the other side of wheel 20 from openings 36 and 42, and are adapted to receive photo-transistors 41 and 39, respectively, for detecting light from light-emitting diodes 43 and 37 through openings 32 and 34 only when a window 100 is aligned with either opening 32 or 34. Advantageously, wheel 20 and housing 30 for encoder 206 (partially shown in FIG. 1) are fabricated of plastic by molding.

FIG. 3 is taken along section line 3—3 of FIG. 2 and shows a part of the surface of wheel 20 and a partial cross-sectional view of housing 30. The lateral spacing of openings 32, 34 and of windows 100 is such that when opening 32 is fully aligned with window 100a, opening 34 is half covered by the wheel portion between windows 100b and 100c, and half exposed through window 100c. Accordingly, a light source within opening 42 and communicating with opening 32 can transmit through window 100a and into opening 40, where photo-transistor 41 receives the light and produces an electrical output. Since window 100c is only partially aligned with opening 34, photo-transistor 39, associated with opening 38, has a reduced electrical signal output amplitude compared to the output amplitude of photo-transistor 41 associated with opening 32. From the relative position of openings 32 and 34 and the windows 100, it can be appreciated that as wheel 20 rotates the magnitude of the light transmitted through openings 32 and 34 will vary approximately sinusoidally and that the sinusoid of the light output associated with opening 32 is displaced 90 electrical degrees from the sinusoid of the light output associated with opening 34. Further, in the situation illustrated in FIG. 3, (i.e., with opening 32 fully exposed by window 100a) the change in the magnitude of the output of photo-transistor 39 associated with opening 34 can indicate the direction of rotation of wheel 20, since if this output is increasing at such time, wheel 20, as shown in FIG. 3, is rotating counterclockwise and, if the output is decreasing at such time, wheel 20 is rotating clockwise.

Figure 4:
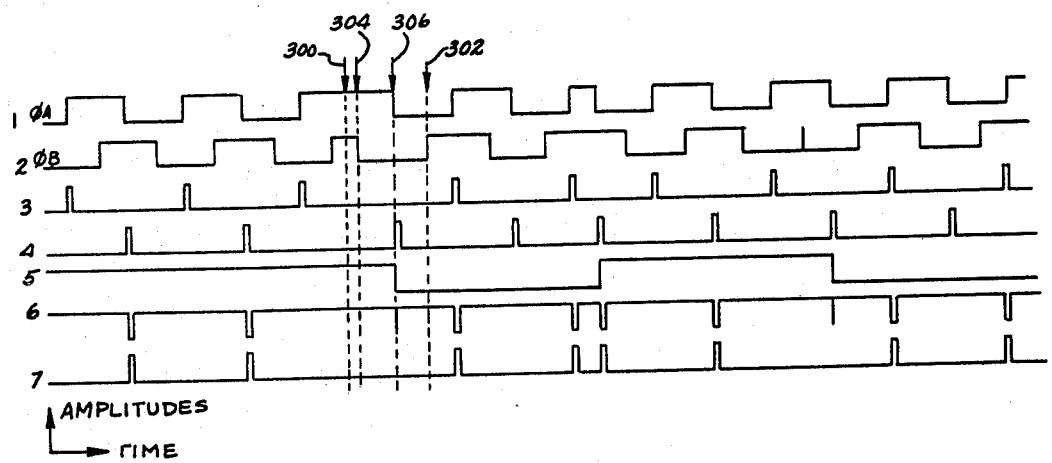
FIG. 4 shows a coordinated series of wave forms associated with the operation of an encoder in accordance with an embodiment of this invention.
Figure 5:
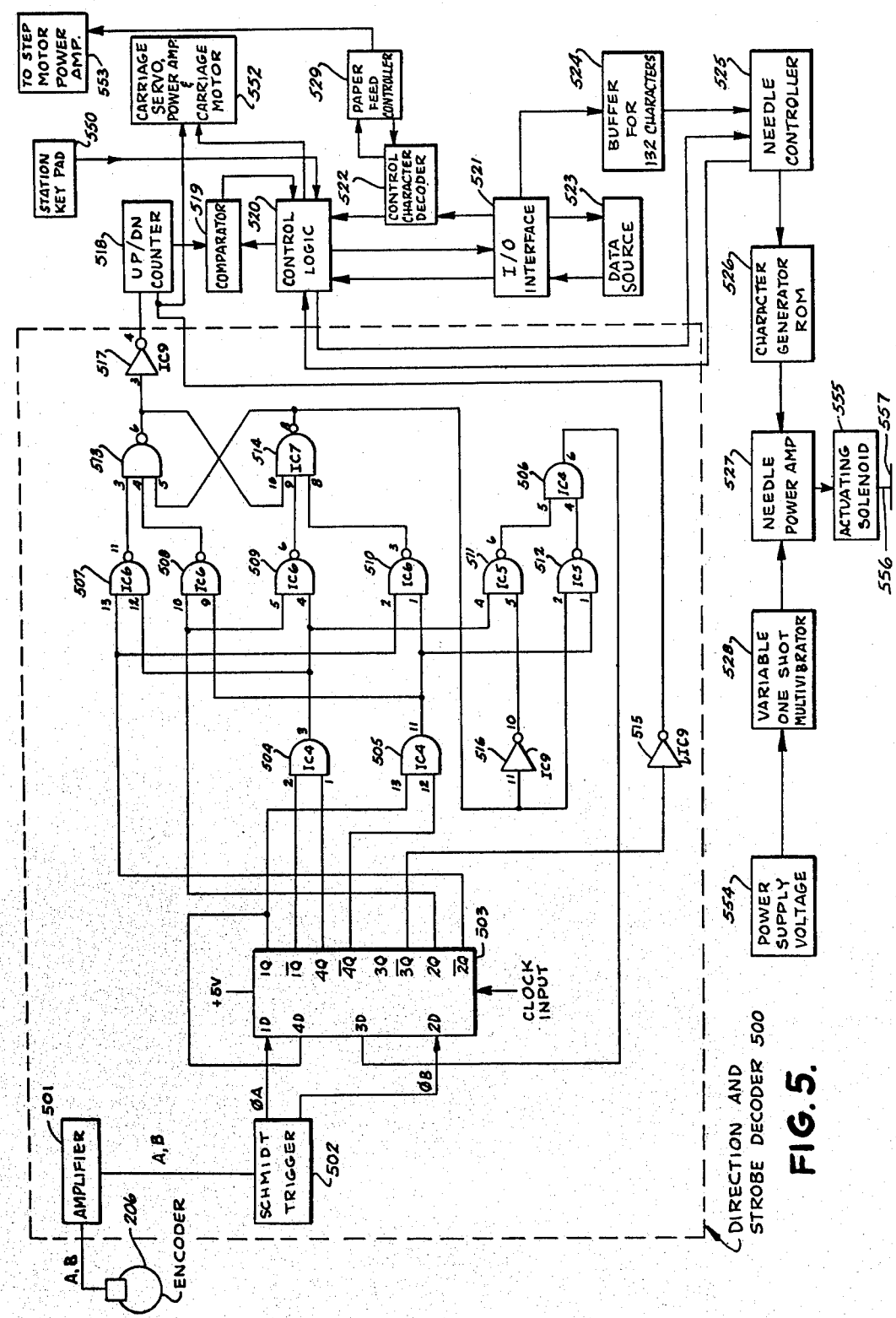
FIG. 5 is a block diagram of a circuit for processing encoder signals.

FIG. 4 shows a series of waveforms, with time along the horizontal axis and amplitude along the vertical axis, generated by decoding circuitry, shown in block form in FIG. 5, from the output of encoder 206. The approximately sinusoidal output produced by photo-transistors 39 and 41, denoted output A and B, monitoring the light variations within openings 32 and 34 is applied to a differential amplifier 501 (shown in FIG. 5) to increase the magnitude of the signal. The amplified sinusoidal outputs A and B are coupled from amplifier 501 to a Schmidt trigger 502 which changes the sinusoidal form of outputs A and B into square waves, corresponding to phase A ($\phi A$) and phase B ($\phi B$) shown as lines 1 and 2, respectively, in FIG. 4. Transformation of the sine waves to square waves facilitates an analysis and comparison of the wave forms. To this end, phases A and B are applied to logic circuitry which performs comparison of the two phases to determine the amount and direction of rotation of wheel 20 and, in turn, the amount and direction of movement of printing head 200. More specifically, the position of the printing head 200 along the platen 202, i.e., along the printing surface 557 may be monitored by monitoring, and algebraically summing, the pulses produced by rotating wheel 20. The time of firing of the printing needles or styli 556 to produce dot matrix printed characters can be controlled as a function of the pulses produced by the rotating wheel 20 of the encoder 206. If, as a general rule, each such pulse is synchronized to, or used to trigger, the printing of one dot by a given needle 556 in the printing head 200 and the repetition rate of the square wave of phases A and B is directly related to the circumferential spacing of windows 100, the spacing of windows 100, in a sense, determines the spacing of dots imprinted by the printing head 200 on the surface 557 to be printed.

The direction of rotation of wheel 20, and thus the direction of travel of printing head 200, may be determined by noting the level of one phase at the time of transition from a zero level to a one level of the other phase. For example, if phase B has a level transition from zero to one and phase A is at a one level at that time, wheel 20 can be defined as rotating in a first direction (as shown in FIG. 3, toward the left). Analogously, if phase B has a transition from zero to one and phase A is zero, wheel 20 can be defined as rotating in the other direction, e.g., towards the right. A reversal in direction of rotation is indicated by an arrow 300 shown in FIG. 4. To the right of arrow 300, at the point designated by arrow 302, phase B has a zero to one transition, phase A is at a zero level, indicating leftward rotation. To the left of arrow 300, when phase B has a zero to one transition, phase A is at a one level, indicating a rightward rotation.

Since the information from these phases A, B is used to control (i.e., command) printing operation by the printing head 200 at a particular horizontal location along the platen 202 and over the printing surface 557, it is desirable to know as soon as possible when a reversal in direction of printing head movement (i.e., encoder rotation) has occurred. If a zero to one transition of phase B is used to initiate interrogation of the direction of rotation, the first electrical indication that a physical change in direction of rotation has occurred at arrow 300 takes place at a time denoted by arrow 302. An earlier electrical indication of the physical transition in direction can be obtained by using a one to zero, instead of a zero to one, transition of phase B, indicated by an arrow 304. Of course, when phase B switches from level one to level zero, a one level, rather than a zero level, of phase A indicates a change in direction of rotation. It can be appreciated that the interval of time between a physical change in direction of wheel 20 and an electrical indication that a change in direction has occurred depends upon the relative levels of phase A and phase B when a physical change in direction takes place and when the level transition which initiates interrogation of direction of rotation. Typically, the level transition initiating interrogation is fixed in advance and the time interval between physical change in direction and electrical indication of change in direction depends upon the relative amplitude of phase A to phase B when physical reversal takes place. That is, phases A and B can both be zero or one, or phases A and B can have different levels.

Lines three through seven of FIG. 4 indicate a preferred processing of the square waves of phase A and phase B at corresponding points in time. Line three shows production of a pulse when phase A has a transition from zero to one, and line four shows production of a pulse when phase A has a transition from level one to level zero. Line five is used to show a change in direction of wheel 20 when the reference used to initiate interrogation of the direction of rotation is the transition from level one to level zero of phase A. More specifically, starting at the left (lines one and two), phase B is at a level of one each time phase A makes a transition from level one to level zero until the time indicated at an arrow 306. The transition of phase A and the level of phase B at arrow 306 is used to indicate a change in direction, and it may be seen that at point 306 direction line five undergoes a transition from level one, indicating one direction of rotation, to level zero, indicating another direction of rotation. Line six is used to keep track of the printing head 200 so each printing position, or dot, is not lost when a change in direction occurs. Line six is obtained by comparing line five with both lines three and four, i.e., if line five is at level one then line six is the complement of line four; if line five is at level zero than line six is the complement of line three. If a pulse occurs on line three of four during a transition of line five, then there is only a spike on line six, as opposed to a full pulse. Line seven is a mirror image of line six, but with the spikes removed. Each pulse on line seven indicates that the printing head 200 is present at a new dot location on the printing surface 557, taking into consideration printing head direction reversals at the points already mentioned.

The generation of the waveforms described above is accomplished in the circuit section 500 shown enclosed within a dotted box labeled Direction and Strobe Decoder in FIG. 5. As already noted, square waves A and B are generated by Schmidt trigger 502, which is coupled to a quad-D flip-flop circuit 503. The inputs of flip-flop circuit 503 also include a clock input, a power supply input and two feedback inputs. The outputs of flip-flop circuit 503 are coupled to a logic network comprising AND circuits 504, 505 and 506, NAND circuits 507 through 514, and inverter circuits 515, 516 and 517. The signal represented by line 5 of FIG. 4 appears at the output of inverter circuit 517 and the signal represented by line 7 of FIG. 4 appears at the input of inverter 515.

Describing circuit section 500 more specifically, the phase A output of Schmidt trigger 502 is coupled to the 1D input of flip-flop circuit 503 and the phase B output of Schmidt trigger 502 is coupled to the 2D input of flip-flop circuit 503. The two inputs of AND circuit 504 are coupled to the $\overline{1Q}$ and 4Q outputs of flip-flop circuit 503. The two inputs of AND circuit 505 are coupled to the 1Q and $\overline{4Q}$ outputs of flip-flop circuit 503. One input of NAND circuit 507 is coupled to the output of AND circuit 504 and the other input of NAND circuit 507 is coupled to the $\overline{2Q}$ output of flip-flop circuit 503. One input of NAND circuit 508 is coupled to the output of AND circuit 505 and the other input of NAND circuit 508 is coupled to the 2Q output of flip-flop circuit 503. The inputs of NAND circuit 509 are coupled to output $\overline{2Q}$ of flip-flop circuit 503 and the output of AND circuit 504; the inputs of NAND circuit 510 are coupled to output 2Q of flip-flop circuit 503 and the output of AND circuit 505; the inputs of NAND circuit 511 are coupled to the output of AND circuit 504 and the output of inverter circuit 516; the inputs of NAND circuit 512 are coupled to the output of NAND circuit 514 and the output of AND circuit 505; the inputs of AND circuit 506 are coupled to the outputs of NAND circuits 511 and 512; the inputs of NAND circuit 513 are coupled to the outputs of NAND circuits 507, 508 and 514; the inputs of NAND circuit 514 are coupled to the outputs of NAND circuits 513, 509 and 510; the input of inverter circuit 517 is coupled to the output of NAND circuit 513; the input of inverter circuit 516 is coupled to the output of NAND circuit 514; and the input of inverter circuit 515 is coupled to output 3Q of flip-flop circuit 503. The 3D input of flip-flop circuit 503 is coupled to the output of AND circuit 506 and the 4D input of flip-flop circuit of 503 is coupled to the 1Q output of flip-flop circuit 503.

The outputs of inverters 515 and 517 are coupled to an up-down counter 518 which forms the first element of a controller group receiving the outputs of circuit section 500. A description of the controller group is found in U.S. patent application Ser. No. 766,242, entitled METHOD AND APPARATUS FOR SETTING AND VARYING MARGINS AND LINE SPACING ON DATA PRINTERS, invented by William Wegryn and Juan F. Velazquez, filed FEB. 9, 1977, now abandoned in favor of continuation application Ser. No. 060,335 filed July 25, 1979, the disclosure of which is hereby incorporated by reference. A comparator 519 is coupled to counter 518 and a control logic and memory circuit 520 which is, in turn, coupled to an input/output interface 521 and a control character decoder 522. Control logic and memory circuit 520 also has an input from an operator-controlled key pad 550 and an input from a needle controller 525. Typical voltage signals from key pad 550 represent the binary number addresses of the left and right-hand margins desired by the operator. If desired, limit switches (not specifically shown) located at the left and right extremes of print head movement can be electrically coupled to logic and memory circuit 520 to provide voltage signals indicating the presence of the printing head 200 at the maximum permissible extreme of travel to either the left or the right. Alternatively, maximum lateral travel can be indicated by an absence of pulses from encoder 206 during a period of time such as, for example, 50 milliseconds. The absence of pulses indicates printing head 200 has reached left or right limit or has jammed with respect to lateral movement. Interface 521 is coupled to a data input source 523, to the control character decoder 522, and to a character storage buffer 524. A needle power amplifier 527 is coupled to buffer 524, sequentially, through a character generator read-only memory 526 and a needle controller 525. The needle power amplifier 527 is also coupled to receive an input from a variable one-shot multivibrator 528. A paper feed controller 529 is coupled to control character decoder 522.

Up-down counter 518 stores the current printing head address, i.e., the particular lateral location of the printing head 200 along the platen 202, expressed in binary notation representing the number of dot positions from a reference point. The output of inverter 517 (line 5, FIG. 4) indicates direction thus causing counter 518 to increment or decrement the stored binary number address when the output from inverter 515 (inverse of line 7) indicates the presence of a pulse. More specifically, the voltage level of the signal output of inverter 517 establishes the sign of the binary number represented by the voltage output of inverter 515. Voltage signals sent from counter 518 to comparator 519 represent binary numbers indicating the actual location of the printing head 200 along the platen 202. Comparator 519 also receives voltage signals from control logic circuit 520 representing the binary number address of the location where the printing head 200 is desired to be located by the operator. Comparator 519 compares the voltage signals representing the actual location of the printing head 200 with the voltage signals representing the desired location of the printing head 200 and generates voltage signals representing the difference between the two locations. That is, the output of comparator 519 is a voltage signal representing the distance from the actual location to the desired location of the printing head 200 and is applied to control logic circuit 520.

A carriage servo, power amplifier and motor circuit 552 is coupled to receive an input from control logic and memory circuit 520 and determines the right and left movement of the printing head 200 along the platen 202. Carriage servo, power amplifier and motor circuit 552 also is coupled to receive an output of voltage pulses from circuit section 500 indicating movement of printing head 200. The servo (not specifically numbered) of circuit 552 is set for a given pulse repetition rate and changes the motor speed to attain that repetition rate. That is, if the received pulse repetition rate is too slow, motor speed is increased, and if the received pulse repetition rate is too fast, motor speed is decreased.

The data which is eventually printed on the printing surface 557 by the printing head 200 is supplied at data source 523. A typical source can be, for example, a magnetic memory having information describing a particular paragraph to be printed. Interface 521 is adapted to adjust the level of the voltage signals from data source 523 to the level required by control logic and memory circuit 520. For example, if control logic and memory circuit 520 uses transistor logic, voltage applied to circuit 520 should be in the range of about 0 to 5 volts. In addition to translating voltage levels, interface 521 can also match impedance levels and filter out noise from data source 523. Further, interface 521 is coupled to data source 523 to send voltage signals indicating whether interface 521 can receive additional data.

Paper feed controller 529 applies a voltage signal to power amplifier and step motor 553 causing the paper 557 to move one vertical increment. In one embodiment of this invention, twelve incremental steps are required to move the paper 557 one line. Paper feed controller 529 includes logic and memory circuits for determining the last instructions sent to power amplifier and step motor 553 and for determining how many more increments are acquired to complete one line. Control character decoder 522 decodes characters from data source 523 which are not to be printed but, instead, are used to indicate such actions as line feed, carriage return, horizontal tab and various other control functions. For example, a single character representing the spacing of a certain number of lines is converted into an order for a discrete number of line spacings equal to the desired vertical distance. The completion of a control function is transmitted by a connection from paper feed controller 529 to decoder 522.

Needle controller 525 operates in a manner analogous to paper feed controller 529. More specifically, a character can have for example, 10 vertical segments much the same as each line can have a plurality of horizontal segments. Needle controller 525 has an output of voltage signals representing the next character to be printed and the vertical column in which the character is to start. Information about where the printing head 200 should be located is introduced into control logic and memory circuit 520 and compared in comparator 519 to the current print head address. Information for the actuation or firing of the printing needles 556 is sent from control logic and memory circuit 520 to needle controller 525 and information indicating completion of printing at a given lateral location is sent from needle controller 525 to control logic and memory circuit 520.

In accordance with an embodiment of this invention, print needle actuation current for displacing a printing needle 556 is supplied to an actuating solenoid 555 from an unregulated power supply 554 for a regulated period of time determined by a variable one-shot multivibrator 528 which is coupled to needle power amplifier 527. Needle 556 is mechanically coupled to actuating solenoid 555 which, in turn, is electrically coupled to power supply 554 through the serial combination of multivibrator 528 and needle power amplifier 527. Needle power amplifier 527 is also electrically coupled to character generator memory 526 and receives a voltage level from character generator memory 526 which determines whether a pulse from multivibrator 528 supplying power is accepted or rejected.

Although unregulated power supplies are desirable because there is no heat generated by regulation and cooling requirements are therefore reduced, they may adversely affect the consistency and quality of the printed dots, which depend on the amount of power supplied to the solenoids 555 of the printing needles 556. Multivibrator 528 has an input representative of the voltage level of power supply 554, and serves to regulate the duration of the time power supply 554 supplies current to the actuating solenoids 555 which drive the printing needles 556. Thus, regulation is accomplished by changing the width, i.e., duration, of an actuating pulse from power supply 554 to needle power amplifier 527. The power supply actuating pulse can be initiated, for example, by the pulses shown in FIG. 4, line 7, indicating a printing position has been reached. The action of variable one-shot multivibrator 528 is much like that of a switch which is closed during the duration of the pulse thereby connecting power supply 554 to power amplifier 527. Since a relatively constant amount of power is desired to be applied to the solenoids 555 activating the needles 556, a high voltage at the output of power supply 554 causes variable one-shot multivibrator 528 to remain closed a shorter period of time than when a lower voltage is present at the output of power supply 554. As a result, although power supply 554 is not regulated the power applied to needle power amplifier 527 is substantially regulated.

Figure 6:
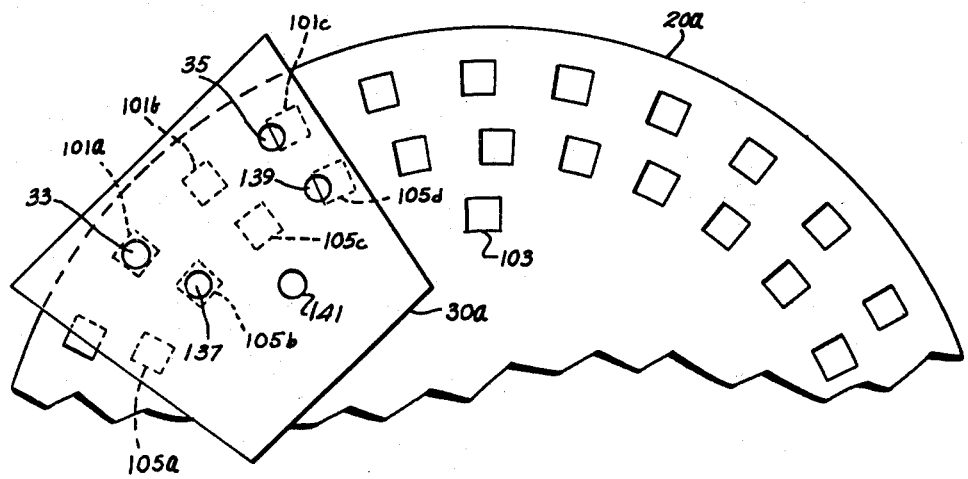
FIG. 6 is a partial front elevational view, similar to FIG. 3, of an encoder wheel in accordance with another embodiment of this invention.

Referring to FIG. 6, there is shown a wheel 20a in accordance with another embodiment of this invention. Wheel 20a has a higher effective density of light-passing windows and permits a higher density of characters on the printed surface 557. Wheel 20a includes an outer ring of equally-spaced windows 101a, 101b, et seq. as in the embodiment shown in FIG. 2 (which for purposes of illustration here may be considered as including twenty such windows). Additionally, an innermost ring has a single window 103 to provide synchronization pulses, and an intermediate ring has another series of equally spaced windows 105, i.e., 105a, 105b, et seq. which for illustration may include thirty-three windows, as opposed to twenty, to provide a higher dot density on the printing surface 557. A housing 30a, similar to housing 30 of FIG. 1, has five openings to pass light between five pairs of light-emitting diodes and photo-transistors. As in the embodiment in FIG. 2, the outer row of windows 101 has two openings in housing 30a associated with it, here designated 33 and 35. Similarly, the intermediate row of windows 105 has two housing openings 137 and 139 associated with it. In each case, the two openings 33, 35 and 137, 139 and their associated two pairs of light-emitting diodes and photo-transistors are used to determine the direction of rotation of wheel 20a. A selective switching means (not specifically shown) may be used to choose the electrical outputs associated with either the outer or intermediate ring depending upon the dot density desired. For example, such a selective switching means can be included in amplifier 501, although any conventional switch could be used if desired.

The innermost ring with single window 103 has a single light-emitting diode and photo-transistor pair associated with it in housing 30a, at an opening 141 aligned to intersect the innermost ring. The output pulse produced by window 103 in the third ring is used to indicate the passing of window 103 by housing 30a which occurs once during each rotation of wheel 20a. This output pulse is used as a synchronization check to make sure that the number of windows counted during each complete rotation of wheel 20a is equal to the actual known number in the outer row or in the intermediate ring, whichever is selected. It is possible, in actual practice, for the printing head 200 to go out of synchronization for any number of reasons, including an electrical noise spike giving an erroneous indication of movement, or slippage or variation in the mechanical coupling between the printing head 200 and the encoder 206.

Synchronization is accomplished by counting the pulses from the selected ring of multiple equally-spaced windows 101, 105 after a pulse is received from the innermost synchronization ring containing only a single window 103. After the number of pulses corresponding to the known number of windows 101 in the outer ring are received, another synchronization pulse should be received. A synchronization pulse occurring when fewer than or more than the normal number of pulses have been counted indicates that the physical location of the printing head 200 is not synchronized with the location of the printing head 200 as indicated by the electronic logic circuitry. When such an out-of-synchronization signal is received, printing can be stopped by appropriate means, or an alarm signal sounded. If printing were to continue, provision can be made for electronically modifying the address counter 518 so that it reflects the correct head position. Any misalignment of left and right margins of a printed line may also be taken as an indication of a loss of synchronization of the printing head 200.

If, for example, an outer ring having twenty windows 101 is used to activate a printing head 200 to form a dot matrix character on the printing surface 557, and each window 101 is correlated to a single dot position of the printing head 200 across the platen 202, there may advantageously be ten character spaces per inch and each character space may have twelve vertical columns, with the last three vertical columns being used for spacing between adjacent printed characters. Thus the characters themselves may each consist of nine vertical columns. If, for comparison, the intermediate ring having thirty-three windows 105 is used, with other factors remaining the same, the character density will increase to sixteen and one-half characters per inch. In effect, each character is made narrower when the intermediate ring is used than when the outer ring is used. The number of characters printed per second remains the same, and is not affected by the particular ring used, but the speed of movement of the printing head 200 is less when the intermediate row of windows 105 is used than when the outer row of windows 101 is used. Of course, the encoding techniques described, including the particular examples given for illustration, may be used with many different specific printer speeds.

Various modifications and variations will no doubt occur to those skilled in the art to which this invention pertains. For example, the coupling of the encoder 206 to the printing head 200 may be varied from that disclosed herein. Similarly, the shape and spacing of the windows 100, 101, 105 may be varied from that disclosed here. These and all other variations which basically rely on the teachings through which this disclosure has advanced the art are properly considered within the scope of this invention.

The embodiments of the invention in which an exclusive property or privilege is claimed are defined as follows:

1. A data printing machine of the type having laterally movable printing means for selectively printing alphanumeric characters on a printing surface and having driving means for moving said printing means along a lateral path so that characters may be printed in horizontal rows, said printing machine further having an encoder means coupled to be actuated in accordance with the lateral movement of said printing means so as to produce first and second electrical pulse signal trains embodying information indicative of the position of said printing means along said lateral path, said electrical pulse signal trains having substantially the same electrical characteristics but being offset from one another by a known phase difference, said first electrical pulse signal train comprising a leading electrical pulse signal train when said printing means is moving in a first direction and comprising a lagging electrical pulse signal train when said printing means is moving in a second direction, respectively, said second electrical pulse signal train comprising a lagging electrical pulse signal train when said printing means is moving in said first direction and comprising a leading electrical pulse signal train when said printing means is moving in said second direction, respectively, said printing machine further comprising: means for electrically decoding the first and second electrical pulse signal trains produced by the encoder means so as to obtain early and accurate indications whenever the printing means reverses its direction of motion along the path of its lateral travel, said means for electrically decoding comprising comparison means coupled to receive said first and second electrical pulse signal trains and conditioned to detect the instantaneous logic level state existing in the leading electrical pulse signal train in relation to the event of a transition in the logic level state of the lagging electrical pulse signal train, to thereby determine at the earliest instant any change in the direction of motion of the printing means from the direction of previous movement, said comparison means being conditioned to determine the direction of printing by comparing the logic level of a pulse in the leading electrical pulse signal train with a transition event in the logic level of the corresponding pulse in the lagging electrical pulse signal train, said transition event being a change from the particular type of logic state the existing in the lagging electrical pulse signal train to the opposite type of logic state, in order to obtain an early indication of reversal of the direction of printing.

2. A data printing machine of the type having laterally movable printing means for selectively printing alphanumeric characters on a printing surface and having driving means for moving said printing means along a lateral path so that characters may be printed in horizontal rows, said printing machine further having an encoder means coupled to be actuated in accordance with the lateral movement of said printing means so as to produce first and second electrical pulse signal trains embodying information indicative of the position of said printing means along said lateral path, said electrical pulse signal trains having substantially the same electrical characteristics but being offset from one another by a known phase difference, said first electrical pulse signal train comprising a leading and a lagging electrical pulse signal train when said printing means is moving in a first and a second direction respectively, said second electrical pulse signal train comprising said lagging and said leading electrical pulse signal trains when said printing means is moving in said first and second directions respectively, said printing machine further comprising: means for electrically decoding the first and second electrical pulse signal trains produced by the encoder means so as to obtain early and accurate indications whenever the printing means reverses its direction of motion along the path of its lateral travel, said means for electrically decoding comprising comparison means coupled to receive said first and second electrical pulse signal trains and conditioned to detect the instantaneous logic level state existing in the leading electrical pulse signal train in relation to the event of a transition in the logic level state of the lagging electrical pulse signal train, to thereby determine at the earliest instant any change in the direction of motion of the printing means from the direction of previous movement, said comparison means being conditioned to determine the direction of printing by comparing the logic state of a pulse in the lagging electrical pulse signal train with a transition event in the logic state of the corresponding pulse in the leading electrical pulse signal train, the transition event being a change from the same type of logic state then existing in the leading electrical pulse signal train to the opposite type of logic state, in order to obtain an early indication of any change in the direction of printing.

3. A data printing machine of the type having laterally movable printing means for selectively printing alphanumeric characters on a printing surface and having driving means for moving said printing means along a lateral path so that characters may be printed in horizontal rows, said printing machine further having an encoder means coupled to be actuated in accordance with the lateral movement of said printing means so as to produce first and second electrical pulse signal trains embodying information indicative of the position of said printing means along said lateral path, said electrical pulse signal trains having substantially the same electrical characteristics but being offset from one another by a known phase difference, said first electrical pulse signal train comprising a leading and a lagging electrical pulse signal train when said printing means is moving in a first and a second direction respectively, said second electrical pulse signal train comprising said lagging and said leading electrical pulse signal trains when said printing means is moving in said first and second directions, respectively, said printing machine further comprising: means for electrically decoding the first and second electrical pulse signal trains produced by the encoder means so as to obtain early and accurate indications whenever the printing means reverses its direction of motion along the path of its lateral travel, said means for electrically decoding comprising comparison means coupled to receive said first and second electrical pulse signal trains and conditioned to detect the instantaneous logic level state existing in the leading electrical pulse signal train in relation to the event of a transition in the logic level state of the lagging electrical pulse signal train, to thereby determine at the earliest instant any change in the direction of motion of the printing means from the direction of previous movement, said comparison means being conditioned to determine the direction of printing by comparing the logic level of a pulse in the leading electrical pulse signal train with a transition event in the logic level of the corresponding pulse in the lagging electrical pulse signal train, said transition event being a change from the particular type of logic state then existing in the lagging electrical pulse signal train to the opposite type of logic state, in order to obtain an early indication of reversal of the direction of printing, said comparison means being conditioned to determine the instantaneous position of the printing means at a particular location as a function of printing movement direction and reversals of direction by producing from said first and second electrical pulse signal trains a first interim pulse series whose pulses indicate transitions in logic state from a low to a high level in the first electrical pulse signal train, by producing a second interim pulse series whose pulses indicate transitions in logic state from a high to low level in the first electrical pulse signal train, by producing a third interim pulse series representing the logic level condition of the second electrical pulse signal train at the times when pulses occur in the second interim pulse series, and by producing a fourth interim pulse series representing comparison of said third interim pulse series with both said first and said second interim pulse series.

4. A data printing machine of the type having laterally movable printing means for selectively printing alphanumeric characters on a printing surface and having driving means for moving said printing means along a lateral path so that characters may be printed in horizontal rows, said printing machine further having an encoder means coupled to be actuated in accordance with the lateral movement of said printing means so as to produce first and second electrical pulse signal trains embodying information indicative of the position of said printing means along said lateral path, said electrical pulse signal trains having substantially the same electrical characteristics but being offset from one another by a known phase difference, said first electrical pulse signal train comprising a leading and a lagging electrical pulse signal train when said printing means is moving in a first and a second direction respectively, said second electrical pulse signal train comprising said lagging and said leading electrical pulse signal trains when said printing means is moving in said first and said second directions respectively, said printing machine further comprising: means for electrically decoding the first and second electrical pulse signal trains produced by the encoder means so as to obtain early and accurate indications whenever the printing means reverses its direction of motion along the path of its lateral travel, said means for electrically decoding comprising comparison means coupled to receive said first and second electrical pulse signal trains and conditioned to detect the instantaneous logic level state existing in the leading electrical pulse signal train in relation to the event of a transition in the logic level state of the lagging electrical pulse signal train, to thereby determine at the earliest instant any change in the direction of motion of the printing means from the direction of previous movement, said comparison means being conditioned to determine the direction of printing by comparing the logic state of a pulse in the lagging electrical pulse signal train with a transition event in the logic state of the corresponding pulse in the leading electrical pulse signal train, the transition event being a change from the same type of logic state then existing in the leading electrical pulse signal train to the opposite type of logic state, in order to obtain an early indication of any change in the direction of printing, said comparison means being conditioned to determine the instantaneous position of the printing means at a particular location as a function of printing movement direction and reversals of direction by producing from said first and second electrical signal trains a first interim pulse series whose pulses indicate transitions in logic state from a low to a high level in the first electrical pulse signal train, by producing a second interim pulse series whose pulses indicate transitions in logic state from a high to a low level in the first electrical pulse signal train, by producing a third interim pulse series representing the logic level condition of the second electrical pulse signal train at the times when pulses occur in the second interim pulse series, and by producing a fourth interim pulse series representing comparison of said third interim pulse series with both said first and said second interim pulse series.

* * * * *